US011427506B2

(12) United States Patent
Schultz et al.

(10) Patent No.: US 11,427,506 B2
(45) Date of Patent: Aug. 30, 2022

(54) METHOD FOR PRODUCING HYDROPHOBIC HEAT INSULATION MATERIAL

(71) Applicant: Evonik Operations GmbH, Essen (DE)

(72) Inventors: Thorsten Schultz, Hassenroth (DE); Matthias Geisler, Nörten-Hardenberg (DE); Maciej Olek, Kahl (DE); Juri Tschernjaew, Aschaffenburg (DE); Hark-Oluf Asbahr, Gönnheim (DE); Gabriele Gärtner, Hanau (DE)

(73) Assignee: Evonik Operations GmbH, Essen (DE)

(*) Notice: Subject to any disclaimer, the term of this patent is extended or adjusted under 35 U.S.C. 154(b) by 104 days.

(21) Appl. No.: 16/339,081

(22) PCT Filed: Jul. 13, 2017

(86) PCT No.: PCT/EP2017/067660
§ 371 (c)(1),
(2) Date: Apr. 3, 2019

(87) PCT Pub. No.: WO2018/019599
PCT Pub. Date: Feb. 1, 2018

(65) Prior Publication Data
US 2019/0276358 A1    Sep. 12, 2019

(30) Foreign Application Priority Data
Jul. 29, 2016 (EP) .................................... 16181905

(51) Int. Cl.
| *C04B 18/02* | (2006.01) |
| *C04B 14/18* | (2006.01) |
| *C04B 20/10* | (2006.01) |
| *E04B 1/76* | (2006.01) |
| *C04B 30/00* | (2006.01) |
| *C04B 14/06* | (2006.01) |
| *C04B 103/46* | (2006.01) |
| *C04B 103/56* | (2006.01) |
| *C04B 111/28* | (2006.01) |
| *E04B 1/74* | (2006.01) |

(52) U.S. Cl.
CPC ............ *C04B 18/02* (2013.01); *C04B 14/185* (2013.01); *C04B 20/1051* (2013.01); *C04B 30/00* (2013.01); *E04B 1/76* (2013.01); *C04B 14/066* (2013.01); *C04B 2103/465* (2013.01); *C04B 2103/56* (2013.01); *C04B 2111/28* (2013.01); *E04B 2001/742* (2013.01)

(58) Field of Classification Search
CPC ... C04B 18/02; C04B 14/185; C04B 20/1051; C04B 30/00; C04B 14/066; C04B 2103/56; C04B 14/38; C04B 16/06; C04B 24/42; C04B 14/064; C04B 14/18; C04B 20/04; C04B 40/0082; C04B 2103/465; C04B 2111/28; E04B 1/76; E04B 2001/742
See application file for complete search history.

(56) References Cited

U.S. PATENT DOCUMENTS

| 2,595,262 | A | | 5/1952 | Hood |
| 3,532,473 | A | | 10/1970 | Biegler et al. |
| 3,574,027 | A | | 4/1971 | Bonnet |
| 4,048,290 | A | | 9/1977 | Lee |
| 4,175,159 | A | | 11/1979 | Raleigh |
| 4,212,925 | A | | 7/1980 | Kratel et al. |
| 4,247,708 | A | | 1/1981 | Tsutsumi et al. |
| 4,286,990 | A | | 9/1981 | Kleinschmidt et al. |
| 4,297,143 | A | | 10/1981 | Kleinschmidt et al. |
| 5,086,031 | A | | 2/1992 | Deller et al. |
| 5,183,710 | A | | 2/1993 | Gerbino |
| 5,362,541 | A | * | 11/1994 | Sextl .................. C04B 30/00 428/69 |

(Continued)

FOREIGN PATENT DOCUMENTS

| CA | 2 201 186 | 9/1997 |
| CN | 106830878 | 6/2017 |

(Continued)

OTHER PUBLICATIONS

Mathias, et al., "Basic characteristics and applications of aerosil: 30. The chemistry and physics of the aerosil surface," *Journal of Colloid and Interface Science* 125:61-68 (1988).
Pajonk, et al., "Physical properties of silica gels and aerogels prepared with new polymeric precursors," *J. Non-Cryst. Solids* 186(2):1-3 (Jun. 1995).
Somana, Chotangada Gautham, "Evaluation of Aerogel Composite Insulations by Characterization and Experimental Methods," Thesis; B.Eng., R.V. College of Engineering, Banglore, India, (2012).
U.S. Appl. No. 16/978,164, filed Sep. 3, 2020, US-2021/0039954 A1, Feb. 11, 2021, Numrich.
U.S. Appl. No. 17/260,345, filed Jan. 14, 2021, Numrich.
U.S. Appl. No. 17/260,227, filed Jan. 14, 2021, Geisler.

(Continued)

*Primary Examiner* — Shuangyi Abu Ali
(74) *Attorney, Agent, or Firm* — Law Office of Michael A. Sanzo, LLC

(57) ABSTRACT

Process for producing a thermally insulating mixture comprising hydrophobic silica, in which
a) a pulverulent carrier material selected from the group consisting of precipitated silicas, SiO$_2$ aerogels, pearlites and mixtures thereof is coated with a liquid silicon compound, where the liquid silicon compound has at least one alkyl group and a boiling point of less than 200° C., and
b) the pulverulent carrier material that has thus been coated with the liquid silicon compound is mixed with a composition comprising a pulverulent hydrophilic fumed silica and the mixture is subjected to thermal treatment at more than 40° C. and
c) any unreacted silicon compound is subsequently removed from the thermally treated mixture, thus giving the thermally insulating mixture comprising hydrophobic silica.

20 Claims, No Drawings

(56) References Cited

U.S. PATENT DOCUMENTS

| | | |
|---|---|---|
| 5,458,916 A | 10/1995 | Kratel et al. |
| 5,556,689 A | 9/1996 | Kratel et al. |
| 5,565,142 A | 10/1996 | Deshpande et al. |
| 5,589,245 A | 12/1996 | Roell |
| 5,685,932 A | 11/1997 | Stohr et al. |
| 5,776,240 A | 7/1998 | Deller et al. |
| 6,099,749 A | 8/2000 | Boes et al. |
| 6,174,926 B1* | 1/2001 | Menon ............... B01J 13/006 106/490 |
| 6,268,423 B1 | 7/2001 | Mayer et al. |
| 6,303,256 B1 | 10/2001 | Kerner et al. |
| 6,472,067 B1 | 10/2002 | Hsu et al. |
| 7,241,336 B2 | 7/2007 | Scharfe et al. |
| 7,562,534 B2 | 7/2009 | Jibb et al. |
| 7,674,476 B1 | 3/2010 | Schwertfeger et al. |
| 7,855,248 B2 | 12/2010 | Stenzel et al. |
| 8,389,617 B2 | 3/2013 | Meyer et al. |
| 8,603,353 B2 | 12/2013 | Menzel et al. |
| 8,962,519 B2 | 2/2015 | Heindl et al. |
| 9,233,986 B2 | 1/2016 | Kratel et al. |
| 9,540,247 B2 | 1/2017 | Stenzel et al. |
| 9,593,797 B2 | 3/2017 | Kulprathipanja et al. |
| 9,784,402 B2 | 10/2017 | Menzel |
| 9,878,911 B2 | 1/2018 | Maisels et al. |
| 10,179,751 B2 | 1/2019 | Geisler et al. |
| 10,618,815 B2 | 4/2020 | Hindelang et al. |
| 10,618,849 B2 | 4/2020 | Albinus et al. |
| 2003/0095905 A1 | 5/2003 | Scharfe et al. |
| 2006/0027227 A1 | 2/2006 | Everett et al. |
| 2007/0220904 A1 | 9/2007 | Jibb et al. |
| 2008/0277617 A1* | 11/2008 | Abdul-Kader ......... C04B 30/00 252/62 |
| 2010/0146992 A1 | 6/2010 | Miller |
| 2010/0300132 A1 | 12/2010 | Schultz |
| 2012/0064345 A1 | 3/2012 | Gini |
| 2012/0286189 A1 | 11/2012 | Barthel et al. |
| 2013/0071640 A1* | 3/2013 | Szillat ................. E04B 1/7604 428/215 |
| 2014/0150242 A1 | 6/2014 | Kratel et al. |
| 2015/0000259 A1 | 1/2015 | Dietz |
| 2016/0082415 A1 | 3/2016 | Drexel et al. |
| 2016/0084140 A1 | 3/2016 | Dietz |
| 2016/0223124 A1 | 8/2016 | Kulprathipanja et al. |
| 2016/0258153 A1 | 9/2016 | Koebel et al. |
| 2017/0233297 A1 | 8/2017 | Albinus et al. |
| 2017/0268221 A1 | 9/2017 | Geisler et al. |
| 2018/0001576 A1 | 1/2018 | Koebel et al. |
| 2018/0065892 A1 | 3/2018 | Geisler et al. |
| 2019/0276358 A1 | 9/2019 | Schultz et al. |
| 2019/0382952 A1 | 12/2019 | Geisler et al. |
| 2020/0031720 A1 | 1/2020 | Geisler et al. |
| 2020/0062661 A1 | 2/2020 | Geisler et al. |
| 2020/0124231 A1 | 4/2020 | Geisler et al. |
| 2021/0039954 A1 | 2/2021 | Numrich et al. |
| 2021/0269359 A1 | 9/2021 | Geisler et al. |
| 2021/0292233 A1 | 9/2021 | Numrich et al. |
| 2021/0292238 A1 | 9/2021 | Albinus et al. |

FOREIGN PATENT DOCUMENTS

| | | |
|---|---|---|
| DE | 952 891 | 11/1956 |
| DE | 25 3 3 925 | 2/1977 |
| DE | 30 37 409 | 5/1982 |
| DE | 199 48 3 94 | 2/2001 |
| DE | 199 48 394 | 2/2001 |
| DE | 20 2007 013 074 | 3/2008 |
| DE | 10 2007 020 716 | 11/2008 |
| DE | 10 2007 031 635 | 1/2009 |
| DE | 10 2007 042 000 | 3/2009 |
| DE | 10 2007 051 830 | 5/2009 |
| DE | 10 2008 005 548 | 7/2009 |
| DE | 10 2008 036 430 | 2/2010 |
| DE | 10 2010 040 346 | 3/2012 |
| DE | 10 2013 016 705 | 4/2015 |
| DE | 10 2014 203 091 | 8/2015 |
| EP | 0 032 176 | 7/1981 |
| EP | 0 340 707 | 11/1989 |
| EP | 0 645 576 | 3/1995 |
| EP | 0 647 591 | 4/1995 |
| EP | 0 937 755 | 8/1999 |
| EP | 1 988 228 | 11/2008 |
| EP | 2 028 329 | 2/2009 |
| EP | 2 204 513 | 7/2010 |
| EP | 2 910 724 | 8/2015 |
| EP | 3 403 818 | 11/2018 |
| FR | 2873677 | 2/2006 |
| GB | 919018 | 2/1963 |
| NO | 2621873 | 4/2018 |
| WO | WO 99/05447 | 2/1999 |
| WO | WO 03/064025 | 8/2003 |
| WO | WO 2005/028195 | 3/2005 |
| WO | WO 2006/097668 | 9/2006 |
| WO | WO 2010/126792 | 11/2010 |
| WO | WO 2011/066209 | 6/2011 |
| WO | WO 2011/076518 | 6/2011 |
| WO | WO 2011/083174 | 7/2011 |
| WO | WO 2012/041823 | 4/2012 |
| WO | WO 2012/044052 | 4/2012 |
| WO | WO 2012/049018 | 4/2012 |
| WO | WO 2013/053951 | 4/2013 |
| WO | WO 2014/090790 | 6/2014 |
| WO | WO 2014/095277 | 6/2014 |
| WO | WO 2015/007450 | 1/2015 |
| WO | WO 2016/045777 | 3/2016 |
| WO | WO 2016/171558 | 10/2016 |
| WO | WO 2017/097768 | 6/2017 |
| WO | WO 2017/102819 | 6/2017 |
| WO | WO 2018/146137 | 8/2018 |

OTHER PUBLICATIONS

U.S. Appl. No. 17/260,371, filed Jan. 14, 2021, Albinus.

English language translation of the International Search Report for PCT/EP2017/067660 filed Jul. 13, 2017.

English language translation of the Written Opinion of the International Searching Authority for PCT/EP2017/067660 filed Jul. 13, 2017.

Partial English language translation of the International Preliminary Report on Patentability for PCT/EP2017/067660 filed Jul. 13, 2017.

European Search Report and Search Opinion for corresponding EP 16 18 1905 filed Jul. 29, 2018.

Schreiner, et al., "Intercomparison of thermal conductivity measurements on an expanded glass granulate in a wide temperature range," *International Journal of thermal Sciences* 95:99-105 (2015).

Ulmann's Encyclopedia of Industrial Chemistry, "Silica" chapter, published online on Apr. 15, 2008, DOI: 10.1002/14356007.a23_583.pub3.

U.S. Appl. No. 16/478,169, filed Jul. 16, 2019, Not yet published, Geisler.

U.S. Appl. No. 16/484,368, filed Aug. 7, 2019, Not yet published, Geisler.

U.S. Appl. No. 16/605,342, filed Oct. 15, 2019, Not yet published, Geisler.

U.S. Appl. No. 16/620,481, filed Dec. 6, 2019, Geisler.

* cited by examiner

METHOD FOR PRODUCING HYDROPHOBIC HEAT INSULATION MATERIAL

CROSS REFERENCE TO RELATED APPLICATIONS

The present application is US national stage of international application PCT/EP2017/067660, which had an international filing date of Jul. 13, 2017, and which was published on Feb. 1, 2018. Priority is claimed to European application EP 16181905.7, filed on Jul. 29, 2016.

The invention relates to a process for producing a hydrophobic, thermally insulating material.

WO2006/097668 discloses a thermally insulating granular material which is obtained by mixing a hydrophobic silica and an opacifier, followed by compression and granulation.

WO2013/013714 discloses a process for producing a hydrophobic, thermally insulating moulding, in which the vaporous organosilanes are introduced into a chamber containing a microporous thermally insulating moulding comprising hydrophilic silica until the pressure differential Δp≥20 mbar. The process can be performed in such a way that the pressure in the chamber prior to the introduction of the organosilane is either less than or greater than atmospheric pressure.

EP-A-1988228 discloses a process for producing hydrophobic, thermally insulating boards, in which organosilanes in liquid form are added during the operation of mixing a hydrophilic, thermally insulating mixture comprising fumed silica and opacifier, and then compressed. The reaction of the organosilanes with the silica is to take place during the pressing operation or immediately thereafter. It has been found that, depending on the organosilanes used and the temperature that prevails, it is barely possible to obtain thermally insulating boards that have been hydrophobized throughout. The boiling point of the usable organosilanes is between 40 and 130° C.

WO2011/069923 discloses a process for producing hydrophobic, thermally insulating boards, in which, in contrast to EP-A-1988228, liquid organosilanes having a boiling point of more than 130° C. are used. A disadvantage of this process is the difficulty of removing unreacted organosilanes.

WO2016/020215 discloses a process for producing a hydrophobic, thermally insulating moulding, in which a thermally insulating moulding comprising hydrophilic, finely divided silica is contacted with a vaporous hydrophobizing agent to form a moulding coated with hydrophobizing agent, and the latter is subsequently compressed and, during the compression and/or after the compression, reacted with the hydrophobizing agent to form the hydrophobic, thermally insulating moulding. For this purpose, it is necessary that the hydrophilic, thermally insulating moulding, on contacting with the hydrophobizing agent, has a density which is at least 50% of the density of the hydrophobic, thermally insulating moulding after the compression and after the reaction with the hydrophobizing agent. The density of the hydrophobic, thermally insulating moulding is 100-250 kg/m³.

In the processes according to the prior art, organosilanes are used either in liquid or vaporous form. A disadvantage of the supply of the organosilane in vaporous form is time-consuming and costly operations such as cyclical pressure and temperature changes or purging operations. Moreover, costly apparatuses such as vacuum or pressure reactors, vacuum pumps, compressors and evaporators are needed.

A disadvantage of the supply of the organosilane by the liquid phase is considered to be the assurance of homogeneous hydrophobization. Inhomogeneous gas formation can likewise lead to local cracking/blistering in the moulding and hence impair the stability thereof.

The problem addressed by the present invention was therefore that of providing a process improved over the prior art for producing hydrophobic, thermally insulating materials.

The invention provides a process for producing a thermally insulating mixture comprising hydrophobic silica, by
a) coating a pulverulent carrier material selected from the group consisting of precipitated silicas, $SiO_2$ aerogels, pearlites and mixtures thereof with a liquid silicon compound, where the liquid silicon compound has at least one alkyl group and a boiling point of less than 200° C., and
b) mixing the pulverulent carrier material that has thus been coated with the liquid silicon compound with a composition comprising a pulverulent hydrophilic fumed silica and subjecting the mixture to thermal treatment at more than 40° C.,
c) subsequently removing any unreacted silicon compound from the thermally treated mixture, thus giving the thermally insulating mixture comprising hydrophobic silica.

The coating here can be varied between broad limits and is limited merely by the maximum possible coating of the pulverulent carrier material. The maximum coating is defined such that the coated carrier material is a powder which is still free-flowing. Usually, a high loading, meaning 50% or more of the maximum loading, is chosen in order to ensure that the coating is distributed with maximum homogeneity over all the particles of the carrier material. In a preferred embodiment, the proportion of liquid silicon compound is 10-300 g per 100 g of pulverulent carrier material. Particular preference is given to a range of 50-200 g per 100 g of pulverulent carrier material.

The ratio of fumed silica to coated carrier material is not restricted at first. Because of the comparatively poor thermal insulation properties of the precipitated silica and pearlite carrier materials, one will attempt to keep the proportion thereof to a minimum. The $SiO_2$ aerogel pulverulent carrier material has very good thermal insulation properties, and attempts will be made here for economic reasons to keep the proportion low. Preferably, the proportion of the pulverulent carrier material coated with the liquid silicon compound is 1-50 g per 100 g of pulverulent hydrophilic fumed silica. Particular preference is given to a range of 3 to 15 g of coated pulverulent carrier material per 100 g of pulverulent hydrophilic fumed silica.

In general, the amount of liquid silicon compound is chosen such that the pulverulent hydrophilic fumed silica and, if the starting material is a hydrophilic pulverulent carrier material, the carrier material as well is fully hydrophobized.

In a particular embodiment, an increase in mass of 1% to 10% by weight is assumed, which is necessary for complete hydrophobization of the pulverulent hydrophilic fumed silica and any hydrophilic pulverulent carrier material. For this purpose, 1-20 g of liquid silicon compound/100 g of (pulverulent hydrophilic fumed silica+pulverulent hydrophilic carrier material) is chosen.

The coating of the carrier material with the liquid silicon compound will preferably be conducted at a minimum temperature below the boiling point of the liquid silicon compound. In addition, the temperature in the coating operation will be chosen such that no significant reaction of the liquid silicon compound takes place with the pulverulent carrier material. A suitable temperature range that satisfies both criteria is 0-40° C.

The carrier material coated with the liquid silicon compound is subsequently mixed with the pulverulent hydrophilic fumed silica, using standard, gentle mixing methods, for example by means of a ploughshare mixer. Subsequently, the mixture is subjected to thermal treatment at more than 40° C., preferably 60-200° C., more preferably 80-150° C. In the thermal treatment, there is hydrophobization of the pulverulent hydrophilic fumed silica and, if the starting material used is a hydrophilic pulverulent carrier material, of the carrier material as well. It is assumed here that the liquid silicon compound of the coated carrier material is gradually evaporated, the vapour spreads and, caused by the very substantially homogeneous mixing close to the reaction site, reacts with silanol groups of the pulverulent hydrophilic fumed silica. This reaction typically takes place at standard pressure. Reaction products formed, for example $NH_3$ or HCl, leave the mixture because of their vapour pressure and the concentration gradient. The excess silicon compound can be driven out completely. For this purpose, storage for a sufficiently long period, even at room temperature, may be sufficient.

The absorption capacity of silica is determined with respect to DOA, di(2-ethylhexyl) adipate, according to ISO19246: 2016 (en), (https://www.iso.org/obp/ui/#iso:std:iso:19246:ed-1:v1:en).

In the present invention, it is possible with preference to use a pulverulent carrier material having a quotient of DOA absorption/tamped density of 0.005-0.1 l/g, where the DOA absorption is reported in g per 100 g of carrier material and the tamped density in g/l. Particular preference is given to a range of 0.01-0.05 l/g.

The pulverulent hydrophilic fumed silica preferably has a quotient of DOA absorption/tamped density of 0.02-0.1 l/g, more preferably 2.5-10.

The best results are obtained when the quotient of DOA absorption/tamped density of the pulverulent hydrophilic fumed silica is greater than the corresponding quotient of the pulverulent carrier material.

Carrier Materials $SiO_2$ aerogels are produced by drying a gel. The term "aerogel" shall also cover xerogels. A dried gel is referred to as an aerogel when the liquid of the gel is removed at temperatures above the critical temperature and proceeding from pressures above the critical pressure. If the liquid of the gel, by contrast, is removed under subcritical conditions, the gel formed is in many cases also referred to as xerogel. Aerogels may be present either in hydrophilic or hydrophobic form. They have very good thermal insulation properties and good properties as a carrier for the liquid silicon compounds used in the process according to the invention. Examples of $SiO_2$ aerogels can be found in DE-A-19506141 or EP-A-810822.

Precipitated silicas are obtained by reaction of an alkali waterglass with sulphuric acid. The precipitate is filtered, washed and dried. The BET surface area of the precipitated silica used with preference in the process according to the invention is 150-750 $m^2$/g. Precipitated silicas have a good carrier effect based on the volume. Suitable precipitated silicas are disclosed in EP-A-647591, EP-A-798348, EP-A-937755, WO2004/014795, WO2004/065299 and WO2010/012638. Suitable precipitated silicas are obtainable, for example, under SIPERNAT® brand names from Evonik Industries.

As well as precipitated silicas and $SiO_2$ aerogels, it is also possible to use expanded pearlite powders. Because of the comparatively somewhat poorer thermal insulation properties, the use of expanded pearlite powders is an option mainly in mixtures with precipitated silicas and or $SiO_2$ aerogels.

A preferred embodiment of the invention envisages that the pulverulent carrier material has a DOA absorption of 200-300 g/100 g. It is additionally preferable that the tamped density of the carrier material is 90-300 g/l.

Pulverulent hydrophilic fumed silica Fumed silicas are prepared by means of flame hydrolysis or flame oxidation. This involves oxidizing or hydrolysing hydrolysable or oxidizable starting materials, generally in a hydrogen/oxygen flame. Starting materials used for pyrogenic methods include organic and inorganic substances. Silicon tetrachloride is particularly suitable. The hydrophilic silica thus obtained is amorphous. Fumed silicas are generally in aggregated form. "Aggregated" is understood to mean that what are called primary particles, which are formed at first in the genesis, become firmly bonded to one another later in the reaction to form a three-dimensional network. The primary particles are very substantially free of pores and have free hydroxyl groups on their surface. The BET surface area of the fumed silica used with preference in the process according to the invention is 150-500 $m^2$/g. According to DIN 53206, the aggregates generally have diameters of 100 to 1000 nm.

Suitable hydrophilic fumed silicas are obtainable, for example, under AEROSIL® brand names from Evonik Industries.

In a preferred embodiment of the invention, the pulverulent hydrophilic fumed silica has a DOA absorption of 200-300 g/100 g and a tamped density of 30-70 g/l.

The silicon compound used in the process according to the invention is a liquid compound having at least one alkyl group and a boiling point of less than 200° C. It is preferably selected from the group consisting of $CH_3$—Si—$Cl_3$, $(CH_3)_2$—Si—$Cl_2$, $(CH_3)_3$—Si—Cl, $C_2H_5$—Si—$Cl_3$, $(C_2H_5)_2$—Si—$Cl_2$, $(C_2H_5)_3$—Si—Cl, $C_3H_8$—Si—$Cl_3$, $CH_3$—Si—$(OCH_3)_3$, $(CH_3)_2$—Si—$(OCH_3)_2$, $(CH_3)_3$—Si—$OCH_3$, $C_2H_5$—Si—$(OCH_3)_3$, $(C_2H_5)_2$—Si—$(OCH_3)_2$, $(C_2H_5)_3$—Si—$OCH_3$, $C_8H_{15}$—Si—$(OC_2H_5)_3$, $C_8H_{15}$—Si—$(OCH_3)_3$, $(H_3C)_3$—Si—NH—$Si(CH_3)_3$ and mixtures thereof. Particular preference is given to $(H_3C)_3$—Si—NH—$Si(CH_3)_3$.

The composition comprising hydrophilic fumed silica may further comprise at least one IR opacifier and optionally organic or inorganic fibres. The proportion of hydrophilic fumed silica is preferably 60%-90% by weight and that of IR opacifier 10%-30% by weight, based in each case on the composition. The IR opacifier preferably comprises titanium oxides, zirconium oxides, ilmenites, iron titanates, iron oxides, zirconium silicates, silicon carbides, manganese oxides, graphites and/or carbon blacks. The particle size of the opacifiers is generally between 0.1 and 25 μm.

A further development of the process according to the invention envisages compaction of the mixture prior to the thermal treatment.

In this case, the period between compaction and thermal treatment should be very short, in order to minimize evaporation of the silicon compound. Preferably, this period should be not more than 3 hours, more preferably not more than 1 hour and most preferably 1-30 minutes.

In this case, the temperature between compaction and thermal treatment should be low, in order to minimize evaporation of the silicon compound. It should preferably be 0-40° C.

In this way, the mixture can be compacted to a granular material. The tamped density of the granular material is preferably 100-400 g/l. The compaction can be effected, for example, by means of a vacuum roll compactor.

The mixture can likewise be compressed prior to the thermal treatment to a board having a density which is preferably in the density range of 140-200 kg/m³.

The invention further provides a thermal insulating board comprising a hydrophobized fumed silica and a hydrophobized precipitated silica, wherein the proportion of precipitated silica is 3-15 g per 100 g of hydrophobized fumed silica, and the carbon content is 3%-10% by weight, based on the board.

EXAMPLES

Example 1

108 g of HMDS (hexamethyldisilazane) are metered gradually into 60 g of SIPERNAT® 50 S while stirring over a period of 45 minutes. This gives rise to a free-flowing powder. At a temperature of 20° C., 9.5 g of this powder are mixed into 50 g of a mixture consisting of 80% by weight of AEROSIL® 300 and 20% by weight of SiC (SILCAR G14 from ESK-SIC), and mixed in at low speed for 5 minutes. The tamped density is about 60 g/l. The mixture thus obtained is introduced into an oven preheated to 150° C. with nitrogen blanketing and gas suction, and kept at this temperature for 2 hours. Thereafter, the oven is switched off and left to cool for 12 hours.

Example 2

108 g of HMDS are metered gradually into 60 g of SIPERNAT® 50 S while stirring over a period of 45 minutes. This gives rise to a free-flowing powder. At a temperature of 20° C., 9.5 g of this powder are mixed into 50 g of a mixture consisting of 80% by weight of AEROSIL® 300 and 20% by weight of SiC (SILCAR G14 from ESK-SIC), and mixed in by means of a ploughshare mixer for 5 minutes. The tamped density is about 60 g/l.

This mixture is compacted by means of a vacuum compactor roll, Vacupress, to a tamped density of 250 g/l. Within a period of three hours since its production, the mixture thus obtained is introduced into an oven preheated to 150° C. with nitrogen blanketing and gas suction, and kept at this temperature for 2 hours. Thereafter, the oven is switched off and left to cool for 12 hours.

Example 3

108 g of HMDS are metered gradually into 60 g of SIPERNAT® 50 S while stirring over a period of 45 minutes. This gives rise to a free-flowing powder. At a temperature of 20° C., 9.5 g of this powder are mixed into 50 g of a mixture consisting of 80% by weight of AEROSIL® 300 and 20% by weight of SiC (SILCAR G14 from ESK-SIC), and mixed in by means of a ploughshare mixer for 5 minutes. The tamped density is about 60 WI. The mixture thus obtained is compacted to a board by means of an evacuatable press. The mixture is compacted here at least by a factor of 2 within one minute. Thereafter, the board is decompressed.

Within a period of three hours since its production, the board thus obtained is introduced into an oven preheated to 150° C. with nitrogen blanketing and gas suction, and kept at this temperature for 2 hours. Thereafter, the oven is switched off and left to cool for 12 hours.

The density of the resulting board is 160 WI.

TABLE

| Feedstocks - physicochemical values | |
| --- | --- |
| SIPERNAT ® 50 S | |
| BET surface area | 500 m²/g |
| DOA absorption | 258 g/100 g |
| Tamped density | 105 g/l |
| DOA absorption/tamped density | 0.025 l/g |
| AEROSIL ® 300 | |
| BET surface area | 300 m²/g |
| DOA absorption | 235 g/100 g |
| Tamped density | 50 g/l |
| DOA absorption/tamped density | 0.047 l/g |
| Calculated values | |
| g HMDS/100 g SIPERNAT ® 50 S | 180 |
| g (SIPERNAT ® 50 S + HMDS)/100 g AEROSIL ® 300 | 23.8 |
| g HMDS/100 g (SIPERNAT ® 50 S + AEROSIL ® 300) | 14 |

AEROSIL® 300 as the fumed silica and SIPERNAT® 50 S used as the carrier material show comparable DOA absorption. The effect of the carrier material having a tamped density higher by a factor of 2 compared to AEROSIL® 300 is that the proportion by volume of the carrier material in a thermal insulation body or thermal insulation granules is lower by a factor of 2 compared to a thermal insulation body or thermal insulation granules in which the fumed silica functions as carrier material. This is advantageous in relation to total thermal conductivity, since the carrier material by its nature is a poorer insulator than fumed silica. If the fumed silica were to be used as the sole carrier material, the advantageous pore structure thereof would be lost because of the capillary forces, and hence the inherently better thermal insulation will likewise worsen.

The invention claimed is:

1. A process for producing a thermally insulating mixture comprising hydrophobic silica, wherein:
   a) a pulverulent carrier material selected from the group consisting of precipitated silicas, SiO₂ aerogels, perlites and mixtures thereof is coated with a liquid silicon compound, wherein the liquid silicon compound has at least one alkyl group and a boiling point of less than 200° C. and wherein coating is performed at a temperature of 0-40° C.;
   b) the pulverulent carrier material that has been coated in step a) with the liquid silicon compound is mixed with a composition comprising a pulverulent hydrophilic fumed silica to form a mixture which is then is subjected to thermal treatment at more than 40° C., thereby forming a thermally treated mixture; and
   c) any unreacted liquid silicon compound is subsequently removed from the thermally treated mixture obtained in step b), thus giving the thermally insulating mixture comprising hydrophobic silica.

2. The process of claim 1, wherein the liquid silicon compound is present in an amount of 10-300 g per 100 g of pulverulent carrier material employed in step a).

3. The process of claim 1, wherein the pulverulent carrier material coated with the liquid silicon compound is present in an amount of 1-50 g per 100 g of pulverulent hydrophilic fumed silica employed in step b).

4. The process of claim 1, wherein the liquid silicon compound employed in step a) is present in an amount of 1-20 g per 100 g of the sum of the amounts of the pulverulent hydrophilic fumed silica employed in step b) and the pulverulent carrier material employed in step a).

5. The process of claim 1, wherein the pulverulent carrier material has a quotient of DOA absorption/tamped density of 0.005-0.1 l/g, wherein the DOA absorption is reported in g per 100 g of carrier material and the tamped density in g/l.

6. The process of claim 1, wherein the pulverulent carrier material has a DOA absorption of 200-300 g/100 g.

7. The process of claim 1, wherein the pulverulent carrier material has a tamped density of 90-300 g/l.

8. The process of claim 1, wherein the pulverulent hydrophilic fumed silica has a quotient of DOA absorption/tamped density of 0.02-0.1 l/g, wherein the DOA absorption is reported in g per 100 g of silica and the tamped density in g/l.

9. The process of claim 1, wherein the quotient of DOA absorption/tamped density of the pulverulent hydrophilic fumed silica is greater than that of the pulverulent carrier material.

10. The process of claim 1, wherein the pulverulent carrier material has been hydrophobized.

11. The process of claim 1, wherein the pulverulent hydrophilic fumed silica has a DOA absorption of 200-300 g/100 g and a tamped density of 30-70 g/l.

12. The process of claim 1, wherein the liquid silicon compound is selected from the group consisting of $CH_3$—Si—$Cl_3$, $(CH_3)_2$—Si—$Cl_2$, $(CH_3)_3$—Si—Cl, $C_2H_5$—Si—$Cl_3$, $(C_2H_5)_2$—Si—$Cl_2$, $(C_2H_5)_3$—Si—Cl, $C_3H_8$—Si—$Cl_3$, $CH_3$—Si—$(OCH_3)_3$, $(CH_3)_2$—Si—$(OCH_3)_2$, $(CH_3)_3$—Si—$OCH_3$, $C_2H_5$—Si—$(OCH_3)_3$, $(C_2H_5)_2$—Si—$(OCH_3)_2$, $(C_2H_5)_3$—Si—$OCH_3$, $C_8H_{15}$—Si—$(OC_2H_5)_3$, $C_8H_{15}$—Si—$(OCH_3)_3$, $(H_3C)_3$—Si—NH—$Si(CH_3)_3$ and mixtures thereof.

13. The process of claim 1, wherein the composition comprising the hydrophilic fumed silica comprises an IR opacifier and/or inorganic fibres.

14. The process of claim 13, wherein the silica is present at 60%-90% by weight and the IR opacifier is present at 10%-30% by weight, based on the composition comprising the hydrophilic fumed silica employed in step b).

15. The process of claim 1, wherein the mixture is compacted prior to the thermal treatment.

16. The process of claim 15, wherein the thermal treatment of the mixture is carried out not more than 3 hours after compaction thereof and wherein, between performing compaction and thermal treatment, the mixture is kept at a temperature in the range of 0-40° C.

17. The process of claim 15, wherein the mixture is compacted to a granular material.

18. The process of claim 15, wherein the mixture is compacted to a board.

19. The process of claim 14, wherein the liquid silicon compound used in step a) is $(H_3C)_3$—Si—NH—$Si(CH_3)_3$ and the thermally insulating mixture is compacted to a granular material with a tamped density of 100-400 g/l.

20. A method for making a structure for insulation comprising
a) a pulverulent carrier material selected from the group consisting of precipitated silicas, $SiO_2$ aerogels, perlites and mixtures thereof is coated with a liquid silicon compound, wherein the liquid silicon compound has at least one alkyl group and a boiling point of less than 200° C. and wherein coating is performed at a temperature of 0-40° C.;
b) the pulverulent carrier material that has been coated in step a) with the liquid silicon compound is mixed with a composition comprising a pulverulent hydrophilic fumed silica to form a mixture which is then is subjected to thermal treatment at more than 40° C., thereby forming a thermally treated mixture;
c) any unreacted liquid silicon compound is subsequently removed from the thermally treated mixture obtained in step b), thus giving the thermally insulating mixture comprising hydrophobic silica; and
d) compacting the thermally insulating mixture comprising hydrophobic silica into a board.

\* \* \* \* \*